Figure 1:
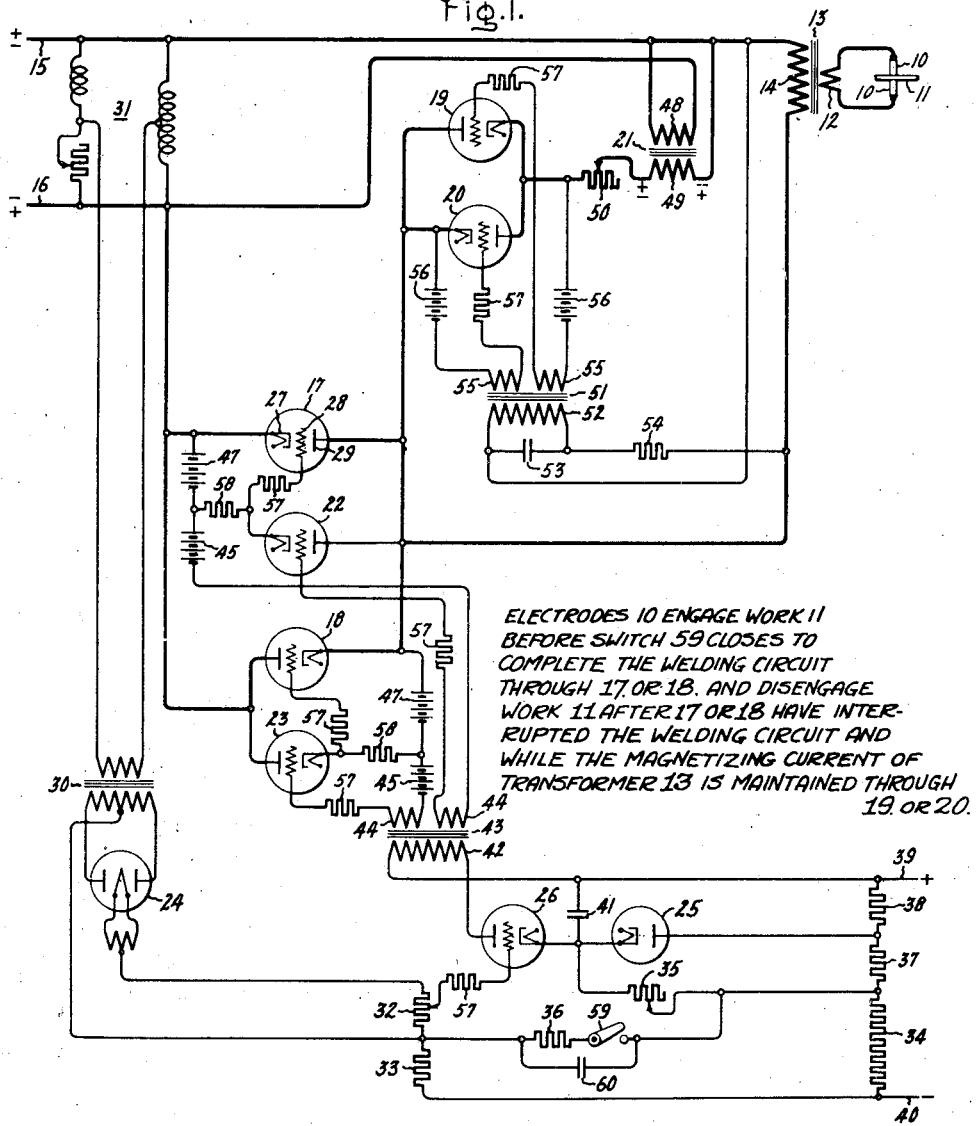

June 14, 1938.  H. W. LORD  2,120,564
CONTROL SYSTEM
Filed Jan. 2, 1937

ELECTRODES 10 ENGAGE WORK 11 BEFORE SWITCH 59 CLOSES TO COMPLETE THE WELDING CIRCUIT THROUGH 17 OR 18, AND DISENGAGE WORK 11 AFTER 17 OR 18 HAVE INTERRUPTED THE WELDING CIRCUIT AND WHILE THE MAGNETIZING CURRENT OF TRANSFORMER 13 IS MAINTAINED THROUGH 19 OR 20.

Inventor:
Harold W. Lord,
by Harry E. Dunham
His Attorney.

Patented June 14, 1938

2,120,564

UNITED STATES PATENT OFFICE 2,120,564

CONTROL SYSTEM

Harold W. Lord, Schenectady, N. Y., assignor to General Electric Company, a corporation of New York Application January 2, 1937, Serial No. 118,877

15 Claims. (Cl. 171—119)

My invention relates to electric control systems.

The change in flux in an inductive circuit which is connected to a source of alternating voltage often produces undesired operating conditions when the inductive circuit is disconnected therefrom. For example, the connection and disconnection of a transformer to and from a source of alternating voltage may produce a reverse current flow in the secondary circuit of the transformer which is objectionable.

In resistance spot welding systems the flow of welding current through the welding electrodes and the work located therebetween is frequently controlled by controlling the connection of the primary of the welding transformer with a source of alternating voltage through the agency of one or more unidirectional conducting devices. In such control systems the disconnection of the welding transformer from the source of alternating voltage through the agency of the unidirectional conducting device or devices leaves in the transformer a flux which on decay causes a reverse current flow in the secondary circuit of the transformer which in turn produces sparking at the electrodes when they are separated from the work immediately after the welding time has been determined by the unidirectional conducting device or devices above referred to. In high speed spot welding operations, especially where the number of welds per second are great in number, this sparking at the electrode due to reverse current flow in the welding transformer resulting from flux decay in the transformer is objectionable in that it decreases the operating life of the welding electrodes and may under certain circumstances spoil the surface finish of the work being welded.

It is an object of my invention to provide means for continuing a sufficient flow of magnetizing current in an inductive circuit to maintain the flux therein sufficiently constant for a predetermined interval of time after the flow of current from a source of alternating voltage through said inductive circuit has been interrupted.

It is also an object of my invention to provide means for controlling the flux in a transformer upon its disconnection from a source of alternating voltage so that a reversal of current in the load connected to the transformer is prevented.

It is a further object of my invention to provide means in a control system in which the conductive connection of the primary of a transformer is controlled through the agency of a unidirectional conducting device or devices, and in which auxiliary means are provided for energizing the transformer to control its flux and prevent a reversal of current in its secondary winding and the load connected thereto when its primary winding is disconnected from the source of alternating voltage through the agency of said unidirectional conducting device or devices.

Figure 2:
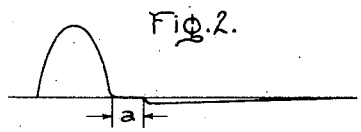
Figure 3:
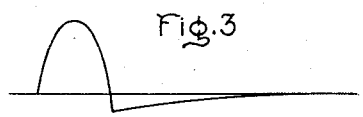

Further objects of my invention will become apparent from a consideration of the following description of one embodiment diagrammatically illustrated in Fig. 1 of the accompanying drawing as applied to the control of a resistance spot welding machine. Fig. 2 of the drawing graphically illustrates the current flow in the secondary circuit of the system illustrated in Fig. 1, and Fig. 3 represents the secondary current flow in such a system when my invention is not employed.

In the system illustrated in Fig. 1, the spot welding electrodes 10 periodically engage and disengage the work 11. While these electrodes are in engagement with the work welding current is supplied thereto from the secondary 12 of a welding transformer 13. The conductive connection of the primary 14 of this welding transformer to a main source of alternating voltage connected between conductors 15 and 16 is controlled through the agency of reversely connected main electric valves 17 and 18 connected in circuit therewith. The main electric valves 17 and 18 are controlled to produce a flow of welding current which is initiated after the electrodes 10 engage the work 11 and which is interrupted before the electrodes disengage the work. Auxiliary electric valves 19 and 20 respectively associated with the main electric valves 17 and 18 control the energization of the primary winding 14 of the welding transformer through the agency of an auxiliary source of alternating voltage supplied by transformer 21 which is connected in series circuit with the auxiliary electric valves 19 and 20 and the primary winding of the welding transformer.

The conductivity of the main electric valves 17 and 18 is determined by control electric valves 22 and 23 whose conductivity in turn is controlled through the agency of an electrical timing circuit which is synchronized with the main source of alternating voltage by being connected therewith. This timing circuit embodies rectifiers 24 and 25 and an electric valve 26. This timing circuit embodies the invention described and claimed in U. S. Letters Patent 2,082,644, granted June 1, 1937, on my copending application tion Serial No. 57,191, filed January 2, 1936 for Electric valve translating circuit and assigned to the assignee of this application.

The electric valves above referred to are unidirectional conducting devices provided with control elements. Each device is provided with a cathode, a control element, and an anode. These elements are respectively identified by reference numerals 27, 28 and 29, applied in the drawing to the electric valve 17. These electric valves may be of the high vacuum type or of the type employing an ionizing medium such as a gas or vapor. I prefer to use the latter type known as the arc discharge type. In such arc discharge devices, current passes as an arc discharge the starting of which is determined by the excitation applied to its control element. After starting, the discharge through the device cannot be further influenced by its control element but may be stopped by removing the anode voltage from the device. The operation of such an arc discharge device consists in controlling its starting by the application of a control voltage to its control element when its anode is positive and removing the positive anode voltage applied to the device to stop the arc discharge initiated by its control element.

In the control circuit above referred to the anode circuit of the full wave rectifier 24 is connected through a peaking transformer 30 to the main source of supply by means of an adjustable phase shift circuit 31 connected between conductors 15 and 16. The output of the rectifier 24 is impressed across a resistor 32 which is connected in circuit with the control element of electric valve 26. Resistors 33, 34, 35 and 36 are also connected in circuit with the control element of this valve. Resistor 34 and resistors 37 and 38 are connected across the plus and minus terminals 39 and 40 of a source of direct current voltage and the voltage drop across resistors 37 and 38 charges a capacitor 41 through resistor 35, the charge on the capacitor being limited to the potential across resistor 38 plus the arc drop in rectifier 25. Capacitor 41 is connected through electric valves 26 to the primary 42 of a control transformer 43. The secondaries 44 of this control transformer are connected in series with a negative bias supplied by batteries 45 to the control elements of control electric valves 22 and 23.

The control electric valves 22 and 23 are connected in series with a negative bias supplied by batteries 47 to the control elements of main electric valves 17 and 18, and when the control electric valves 22 and 23 are rendered conductive by the control circuit main electric valves 17 and 18 are in turn rendered conductive by control electric valves 22 and 23. As stated above the conductivity of main electric valves 17 and 18 conductively connects the primary 14 of the welding transformer 13 to the main source of supply.

The primary 14 of the welding transformer 13 is also connected as noted above to the auxiliary source of alternating voltage supplied by the transformer 21. The primary 48 of this transformer is so connected to the main source of voltage that the voltage supplied by the secondary 49 thereof to the primary 14 of the welding transformer 13 is 180 degrees out of phase with the main source of alternating voltage. A conductive circuit through the secondary 49 of the transformer 21, adjustable resistor 50, auxiliary electric valves 19 or 20, and the primary 14 of welding transformer 13 is determined by the control voltage applied to the control elements of auxiliary electric valves 19 and 20 through the agency of a control transformer 51. The primary 52 of this transformer is connected across a capacitor 53 in a phase shift circuit including capacitor 53 and a resistor 54 which is energized at the same time as the primary 14 of the welding transformer 13 by the conductivity of main electric valves 17 and 18. The secondaries 55 of the control transformer 51 are connected in series with a negative bias supplied by batteries 56 to the control elements of auxiliary electric valves 19 and 20.

Current limiting resistors 57 are connected in the control circuits of each of the electric valves, and a current limiting resistor 58 is connected in circuit with each of the electric valves 22 and 23. A control switch 59 is provided in the timing circuit above described. A surge suppressing condenser 60 is connected across switch 59 and resistor 36.

The system will be better understood from a consideration of its operation which is as follows: The output of the full wave rectifier 24 is impressed across resistor 32 causing a peaked wave having twice the positive peaks per second as the frequency of the main source of alternating voltage connected to the conductors 15 and 16. The negative voltage supplied across resistor 34 is sufficiently great however to prevent the positive peaks appearing across resistor 32 from applying to the control element of electric valve 26 the proper energization to render this electric valve conductive. However, when the switch 59 is closed, current flows through resistors 33 and 36 reducing the bias on the control element of electric valve 26 to a point where the positive peaks of voltage appearing across the resistor 32 is sufficient to render electric valve 26 conductive. Capacitor 41, which has previously been charged through resistor 35 to a potential equal to the voltage across resistor 38 plus the arc drop of rectifier 25, discharges through electric valve 26 and through the primary 42 of the control transformer 43 inducing a surge voltage in the secondaries 44 of this control transformer. This surge voltage is of sufficient magnitude to overcome the negative bias of batteries 45 on the control elements of control electric valves 22 and 23 and render these electric valves conductive. Since the anodes of these electric valves are supplied with alternating voltage 180 degrees out of phase, only one of these electric valves will be rendered conductive. This control valve 22, for example, when rendered conductive overcomes the negative bias voltage applied to the control element of main electric valve 17, thus causing this electric valve to become conductive and impress the main source of alternating voltage across the primary 14 of the welding transformer 13.

Although the timing circuit is capable of being adjusted so as alternately to render the electric valves 17 and 18 conductive periodically at spaced intervals to produce a control suitable for a line welding operation where the electrodes are not separated from the work, in spot welding where the electrodes are separated from the work after each weld the timing circuit is controlled by switch 59 to adapt it for this form of welding.

Switch 59 may be operated by a cam in such a manner that its closing and opening is correlated with the engagement and disengagement of the electrodes 10 with the work 11. As has been stated above, this control is such that the electrodes 10 are in engagement with the work 11 before the main electric valves 17 and 18 become conductive, and these electrodes are not separated from the work until just after the main electric valves 17 and 18 have become non-conductive. The operation of the switch 59 is synchronized with the movement of the electrodes 10 into and out of engagement with the work so that the timing circuit becomes effective for alternately rendering conductive main electric valves 17 and 18 while the electrodes 10 are in engagement with the work and so that the electrodes 10 are not removed from the work until after these main electric valves have interrupted the conductive connection of the welding transformer with the main source of alternating voltage. For example, the arrangement may be such that welds of a half cycle or less are initiated every 3½ cycles of the main source of alternating voltage. With such an arrangement the switch 59 will be opened before the starting of a succeeding half cycle but closed again 7 half cycles following its preceding closure.

The half cycle energization of the welding transformer leaves therein a flux which on decay causes a reverse current flow in the secondary circuit of the transformer through electrodes 10 and work 11. This may amount to 8 per cent of the peaked current flowing during the half cycle in which excitation is applied to the primary of the transformer. This value, while not high on a percentage basis, amounts to 4,000 amperes on the basis of a 50,000 ampere peak welding current which is not unusual in welding machines of this character. The arrangement of the auxiliary electric valves 19 and 20, their associated transformer 21, and the adjustable resistor 50, serve to hold the secondary current at zero for a sufficient length of time to permit the opening of the secondary circuit of the welding transformer by removing the electrodes from the work without producing sparking which would otherwise occur due to a reverse current flow in the secondary circuit resulting from flux decay in the welding transformer after the main electric valves 17 and 18 have become non-conductive.

The auxiliary electric valves 19 and 20 are normally rendered non-conducting by a negative bias supplied by batteries 56, the effect of which is overcome by the secondary voltage of the control transformer 51 which is sufficient to render these electric valves conductive. The primary 52 of the control transformer 51 is connected across the condenser 53 in the phase shift circuit 53, 54 and the lagging voltage across the condenser 53 generates a voltage in the control transformer 51 which renders one or the other of the auxiliary electric valves 19 and 20 conducting after the voltage across the primary of the welding transformer is reversed. It is to be noted, however, that due to the reverse connection of the transformer 21 a reverse voltage is applied across the secondary of the transformer 21 and, consequently, after a reversal of the main and auxiliary sources of voltage, auxiliary electric valves 19 and 20 become conductive respectively after main electric valves 17 and 18 become non-conductive and supply sufficient current, determined by the adjustment of the resistor 50, to the primary 14 of the welding transformer to prevent a decay of flux in the welding transformer core after its primary has been disconnected from the main source of alternating voltage through the agency of main electric valves 17 and 18. By preventing this decay of flux, no immediate reverse current flow will be produced in the secondary of the welding transformer and the current flowing in this circuit will be practically zero for a predetermined interval of time during which time the electrodes 10 may be separated from the work 11 without sparking. This period is illustrated in Fig. 2 at a. Without the control by means of which flux decay is prevented in the welding transformer, the immediate reversal of current in the secondary circuit of the welding transformer which results from flux decay is illustrated in Fig. 3. It will be noted that a substantial reversal of the current in the secondary circuit takes place immediately after the timed flow of welding current and it is this reversal of current which will produce sparking at the electrodes when they are separated from the work at the termination of the flow of welding current.

In the particular control system illustrated the flux in the welding transformer may be maintained substantially constant for not more than a half cycle of the main source of alternating voltage. It is, of course, apparent that by using an auxiliary source of alternating voltage having a longer period than the period of the main source of alternating voltage the flux in the welding transformer may be maintained for a longer time. It is also apparent that by using an auxiliary source of substantially constant voltage the flux may be maintained in the welding transformer indefinitely, that is, until such voltage, which may be a direct current source, is disconnected from the primary of the transformer.

Although my invention has been shown as applied to a half cycle welder, it is apparent that it may also be applied to welders supplying current for any number of half cycles since such operation frequently leaves in the transformer, especially for an odd number of half cycles, a substantial flux which upon decay will produce the undesired reverse current flow in the secondary of the welding transformer.

It is apparent that many modifications may be made in the control specifically described above without departing from the spirit and scope of my invention, and I intend in the appended claims to cover all such modifications as fall within the true spirit and scope of my invention.

What I claim as new and desire to secure by Letters Patent of the United States is:

1. In combination a transformer having primary and secondary windings, a load connected to the secondary winding of said transformer, a source of alternating voltage, means for connecting and disconnecting said source of alternating voltage to and from the primary winding of said transformer, and means for controlling the flux in said transformer to prevent a reversal of current in the secondary winding of said transformer when its primary winding is disconnected from said source of alternating voltage.

2. In combination a transformer having primary and secondary windings, a load connected to the secondary winding of said transformer, a source of alternating voltage, means for connecting and disconnecting said source of alternating voltage to and from the primary winding of said transformer, and means for energizing said transformer to control the flux therein and prevent a reversal of current in its secondary winding when its primary winding is disconnected from said source of alternating voltage.

3. In combination a transformer having primary and secondary windings, a load connected to the secondary winding of said transformer, a source of alternating voltage, means for connecting and disconnecting said source of alternating voltage to and from the primary winding of said transformer, and means for controlling the flux in said transformer to prevent a reversal of current in its secondary winding when its primary winding is disconnected from said source of alternating voltage, said means including an auxiliary source of voltage and means for controlling the energization of said transformer through the agency of said auxiliary source of voltage.

4. In combination a transformer having primary and secondary windings, a load connected to the secondary winding of said transformer, a source of alternating voltage, means for connecting and disconnecting said source of alternating voltage to and from the primary winding of said transformer, and means for energizing the primary winding of said transformer from a second source of voltage upon its disconnection from said source of alternating voltage to prevent a reversal of current in the secondary of said transformer.

5. In combination a transformer having primary and secondary windings, a load connected to the secondary winding of said transformer, a source of alternating voltage, means including a unidirectional conducting device for connecting the primary winding of said transformer to said source of alternating voltage, and means including an auxiliary source of voltage for energizing the primary winding of said transformer to prevent a reversal of current in its secondary winding for a predetermined time after the conductive connection of its primary winding with said main source of alternating voltage has been interrupted by said unidirectional conductive device.

6. In combination an inductive circuit, means including a source of alternating voltage and a unidirectional conducting device for supplying load current through said inductive circuit, and means for continuing a sufficient flow of magnetizing current in said inductive circuit to maintain the flux in said inductive circuit substantially constant for a predetermined interval of time after the reversal of voltage of said source of alternating voltage.

7. In combination a main source of alternating voltage, an inductive load and a unidirectional conducting device connected in series with one another across said main source of alternating voltage, and an auxiliary source of voltage which reverses periodically at substantially the same time as said main source of alternating voltage and a second unidirectional conducting device connected in series with one another across said inductive load with corresponding terminals of said unidirectional conducting devices connected to one terminal of said conductive load and with terminals of opposite polarity of said main and auxiliary sources connected to the other terminal of said load when said main unidirectional conducting device becomes nonconductive.

8. In combination an inductive load circuit, main and auxiliary unidirectional conducting devices connected to supply current in the same direction independently of one another through said inductive load circuit, a main source of alternating voltage connected through said main unidirectional conducting device to said inductive load circuit, and an auxiliary source of alternating voltage connected through said auxiliary unidirectional conducting device to said inductive load circuit, said auxiliary source of voltage being of the same frequency as, and one hundred and eighty degrees out of phase with said main source of alternating voltage.

9. In combination a transformer having a plurality of inductively connected windings, a load connected to one of said windings of said transformer, a main source of alternating voltage, an auxiliary source of alternating voltage of the same frequency as said main source of alternating voltage, means for connecting terminals of opposite polarity of each of said sources of voltage to one terminal of another of said windings of said transformer, means including a main arc discharge device and an auxiliary arc discharge device for connecting the other terminals of said sources of alternating voltage to the other terminal of said other winding of said transformer, said arc discharge devices having control elements and having corresponding electrodes in their anode-cathode circuit connected to the same terminal of said other winding of said transformer, means for controlling the energization of the control element of said main arc discharge device to render said device conductive at a predetermined point in the voltage wave of the main source of alternating voltage, and means responsive to the conductivity of said main arc discharge device for controlling the energization of the control element of said auxiliary arc discharge device to render said auxiliary arc discharge device conductive when the voltages of said main and auxiliary sources reverse.

10. In combination a transformer having a plurality of inductively connected windings, a load connected to one of said windings of said transformer, a main source of alternating voltage, an auxiliary source of alternating voltage having the same frequency as said main source of alternating voltage, means for connecting terminals of opposite polarity of each of said sources of alternating voltage to one terminal of another of said windings of said transformer, means including a main arc discharge device and an auxiliary arc discharge device for connecting the other terminals of said sources of alternating voltage to the other terminal of said other winding of said transformer, said arc discharge devices having control elements and having corresponding electrodes in their anode-cathode circuit connected to the same terminal of said other winding of said transformer, means for controlling the energization of the control element of said main arc discharge device to render said device conductive at a predetermined point in the voltage wave of the main source of alternating voltage, and means including a phase shift circuit energized from said main source of alternating voltage by the conductivity of said main arc discharge device for controlling the energization of the control element of said auxiliary arc discharge device to render said auxiliary arc discharge device conductive when the voltages of said main and auxiliary sources reverse.

11. In combination a transformer having primary and secondary windings, a load connected to the secondary winding of said transformer, main and auxiliary arc discharge devices having control elements and being connected relative to one another to supply current in the same direction independently of one another to the primary of said transformer, a main source of alternating voltage connected through said main arc discharge device to the primary of said transformer, an auxiliary source of voltage connected through said auxiliary arc discharge device to the primary of said transformer for supplying current thereto in the same direction as the current supplied thereto by said main source of alternating voltage through said main arc discharge device, and means for controlling the energization of the control elements of said main and auxiliary arc discharge devices to continue a sufficient energization of the primary of said transformer through said auxiliary arc discharge device to prevent a reversal of current in the secondary of said transformer when said main arc discharge device becomes nonconducting.

12. In combination a transformer having primary and secondary windings, a load connected to the secondary winding of said transformer, main and auxiliary arc discharge devices having control elements and being connected to supply current in the same direction independently of one another to the primary of said transformer, a main source of alternating voltage connected through said main arc discharge device to the primary of said transformer, an auxiliary source of alternating voltage connected through said auxiliary arc discharge device to the primary of said transformer, said auxiliary source of voltage having the same frequency as, and being one hundred and eighty degrees out of phase with said main source of alternating voltage, means for controlling the energization of the control element of said main arc discharge device to render said main arc discharge device conductive, and means for controlling the energization of the control element of said auxiliary arc discharge device to control its conductivity with regard to the conductivity of said main arc discharge device to prevent a reversal of current in the secondary of said transformer upon the reversal of voltages of said main and auxiliary sources of alternating voltage.

13. In combination a source of alternating voltage, a transformer having primary and secondary windings, means including a unidirectional conducting device for connecting the primary winding of said transformer to said source of alternating voltage, means for continuing a sufficient flow of magnetizing current in the primary winding of said transformer to maintain the flux in said transformer substantially constant after said unidirectional conducting device has interrupted the flow of current to the primary circuit of said transformer, and means for connecting a load to the secondary winding of said transformer before said unidirectional conducting device becomes conductive and for disconnecting said load from the secondary winding of said transformer after said unidirectional conducting device has interrupted the flow of current to the primary winding thereof and while the flux in said transformer is maintained substantially constant by said last mentioned means.

14. In combination a transformer having primary and secondary windings, main and auxiliary arc discharge devices having control elements and having their anode-cathode circuits connected in circuit with the primary winding of said transformer for supplying current thereto in the same direction independently of one another, a main source of alternating voltage connected through said main arc discharge device to the primary of said transformer, an auxiliary source of alternating voltage connected through said auxiliary arc discharge device to the primary of said transformer said auxiliary source of alternating voltage being of the same frequency as and one hundred and eighty degrees out of phase with said main source of alternating voltage, means in circuit with said auxiliary source of voltage and said auxiliary arc discharge device for controlling the amount of current flowing in said circuit to the primary of said transformer, means for controlling the energization of the control element of said main arc discharge device to render said device conductive at a predetermined point on the voltage wave of said main source of alternating voltage, and means including a phase-shift circuit energized from said main source of alternating voltage when said main arc discharge device is conductive for controlling the energization of the control element of said auxiliary arc discharge device to render said auxiliary arc discharge device conductive when the voltages of said main and auxiliary sources reverse, and means for connecting a load to the secondary winding of said transformer before said main arc discharge device becomes conductive and for disconnecting said load from the secondary winding of said transformer after said main arc discharge device has become nonconducting and while said auxiliary arc discharge device is conductive.

15. In combination a transformer having primary and secondary windings, a pair of reversely connected main arc discharge devices each of which has associated therewith one of a pair of reversely connected auxiliary arc discharge devices, each of said arc discharge devices having control elements and associated main and auxiliary arc discharge devices having anode-cathode circuits connected in circuit with the primary of said transformer for supplying current thereto in the same direction independently of one another, a main source of alternating voltage connected through said pair of reversely connected main arc discharge devices to the primary of said transformer, an auxiliary source of alternating voltage connected through said pair of reversely connected auxiliary arc discharge devices to the primary of said transformer with its polarity reversed with regard to the polarity of the connection of said main source of alternating voltage to the primary of said transformer, means for controlling the energization of the control elements of said pair of reversely connected main arc discharge devices to render said devices conductive and thereby conductively connect the primary winding of said transformer to said main source of alternating voltage for predetermined time intervals involving an odd number of half cycles of voltage, means for controlling the energization of the control elements of said auxiliary arc discharge device associated with the main arc discharge device last conductive during said predetermined time interval to render said auxiliary arc discharge device conductive and thereby conductively connect the primary winding of said transformer to said auxiliary source of alternating voltage, and means for connecting a load to the secondary winding of said transformer before either of said main arc discharge devices becomes conductive and for disconnecting said load from the secondary winding of said transformer while the primary winding of said transformer is conductively connected through either of said auxiliary arc discharge devices to said auxiliary source of alternating voltage.

HAROLD W. LORD.